UNITED STATES PATENT OFFICE.

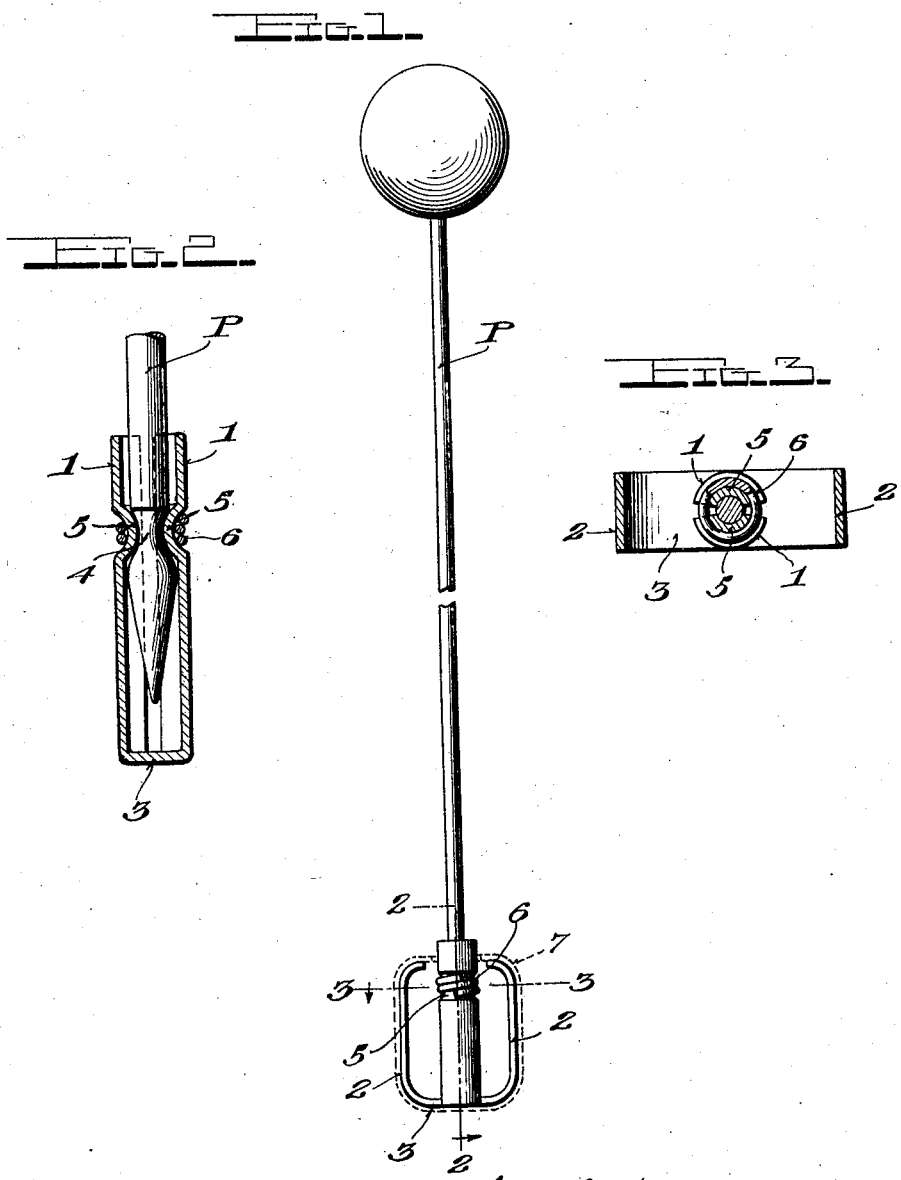

LEVI J. ROY, OF PROVIDENCE, RHODE ISLAND.

JEWELER'S CLUTCH.

1,406,688.  Specification of Letters Patent.  Patented Feb. 14, 1922.

Application filed October 11, 1921. Serial No. 507,125.

*To all whom it may concern:*

Be it known that I, LEVI J. ROY, a citizen of the United States, residing at Providence, in the county of Providence and State of Rhode Island, have invented new and useful Improvements in a Jeweler's Clutch, of which the following is a specification.

This invention relates to certain new and useful improvements in a jeweler's clutch and more particularly is an improvement upon Letters Patent No. 1281844 issued October. 15, 1918.

The primary object of the invention is to provide a clutch which has improved means to hold the pin-engaging spring jaws, fingers or arms against undue outward or spreading movement so as to thereby assure of the effective and positive action of the jaws on or against the pin or the like to which the device is applied and to thereby increase the efficiency of the device as a safety guard or protector.

A further object of the invention is to provide means for the purpose stated, which is simple and economical and which can be easily and quickly applied.

In the drawings:

Figure 1, is a side elevation of the invention;

Figure 2, is an enlarged section on line 2—2 of Figure 1; and

Figure 3, is an enlarged section on line 3—3 of Figure 1.

In proceeding in accordance with the present invention, a pair of spring arms or fingers or jaws 1 are employed which may be formed of a tube having diametrically opposed longitudinal slits, so as to provide each jaw with a concavo-convex cross section. A pair of arms 2 extend up from a base 3, which latter is secured to the lower or base ends of the curved jaws 1. The parts 1, 2 and 3 may be made of an integral structure if desired. The present invention may be used as a guard or safety device applicable to scarf pins or to hat pins, being shown in the drawing as applied to a hat pin so as to protect the point thereof, the pin P for this purpose having a notch or groove 4 of circular form to receive therein concavo-convex clamping shoulders 5 that are formed adjacent the free ends of the curved jaws 1. As depicted in Figure 2 of the drawings the convex parts of the shoulders 5 engage in the groove 4 of the pin P, while the concave sides of the shoulders 5 receive therein a coil spring 6, which acts to constantly force the jaws 1 together so that the convex clamping shoulders 5 will snugly engage in the groove or notch 4. As illustrated in the drawings, the coil spring is wrapped or wound around the jaws or in other words has its coils or convolutions extending peripherally about the jaws and receiving the latter in the convolutions, the ends of the spring being separated or free of connection with each other. In this manner the jaws 1 are restricted against undue outward or spreading movement, thereby assuring effective and positive clamping action of the jaws on or against the pin. It will further be seen that since the coil spring 6 is itself resilient, same will give or slightly expand when the pin point is forced between the jaws 1 to bring the parts into the position of Figure 2.

The arms 2 may be used to support an ornamental casing 7 as shown in dotted lines in Figure 1, though this casing is not essential to the operation of the invention.

From the above it will be apparent that the concavo-convex formation of the parts 5 not only forms the clamping shoulders on the convex sides of these parts, but also provides a seat for the coil spring 6 on their concave sides, thus functioning in a dual manner. Obviously the parts 5 can be rolled into the form shown in the drawings, and hold the spring against movement longitudinally of the jaws.

Having thus described my invention, what I claim as new and desire to secure by Letters Patent is:

1. In a pin guard or protector, a member having a pair of opposed curved jaws, said jaws having alined concavo-convex parts adjacent their free ends, the convex portions forming clamping shoulders to engage the pin, and the concave portions forming a spring seat, and a coil spring encircling the jaws and arranged in the said concave portions so as to hold the jaws together and against spreading movement, the spring having its coils wound around the jaws so as to receive the latter in the coils and having its ends free of connection with each other.

2. In a pin guard or protector, a pair of pin engaging jaws having alined peripheral concave parts, and a coil spring encircling the jaws and arranged in said concave parts to hold the jaws against spreading movement, the spring having its coils wound around the jaws so as to receive the latter in the coils and having its ends free of connection with each other.

In testimony whereof I have signed my name to this specification in the presence of two subscribing witnesses.

LEVI J. ROY.

Witnesses:
M. A. KINGSLEY,
J. A. MILLER.